United States Patent
Ri et al.

(10) Patent No.: US 9,547,625 B2
(45) Date of Patent: Jan. 17, 2017

(54) ELECTRONIC DOCUMENT DISPLAY APPARATUS, IMAGE PROCESSING APPARATUS, IMAGE OUTPUT METHOD, AND COMPUTER READABLE RECORDING MEDIUM STORING PROGRAM

(71) Applicant: Konica Minolta, Inc., Tokyo (JP)

(72) Inventors: Tetsuren Ri, Tokyo (JP); Toyoshige Nounishi, Tokyo (JP); Masahiro Ozawa, Tokyo (JP); Takahisa Matsunaga, Tokyo (JP); Hiroshi Nogawa, Tokyo (JP); Yasufumi Aoyama, Tokyo (JP); Kunikazu Satou, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 900 days.

(21) Appl. No.: 13/714,820

(22) Filed: Dec. 14, 2012

(65) Prior Publication Data

US 2013/0159823 A1 Jun. 20, 2013

(30) Foreign Application Priority Data

Dec. 15, 2011 (JP) ................................. 2011-274143

(51) Int. Cl.
  *G06F 17/21* (2006.01)
  *G06F 17/00* (2006.01)
  *G06F 17/22* (2006.01)

(52) U.S. Cl.
  CPC ............. *G06F 17/00* (2013.01); *G06F 17/211* (2013.01)

(58) Field of Classification Search
  CPC ....................................................... G06F 17/21
  (Continued)

(56) References Cited

U.S. PATENT DOCUMENTS

| | | | |
|---|---|---|---|
| 7,580,568 B1* | 8/2009 | Wang et al. | 382/173 |
| 2004/0146199 A1* | 7/2004 | Berkner | G06T 11/60 |
| | | | 382/176 |
| 2012/0008864 A1* | 1/2012 | Kanatsu | G06K 9/00449 |
| | | | 382/176 |

FOREIGN PATENT DOCUMENTS

| | | |
|---|---|---|
| JP | 11-212982 A | 8/1999 |
| JP | 2006-243867 | 9/2006 |

(Continued)

OTHER PUBLICATIONS

Office Action in counterpart Japanese Patent Application No. 2011-274143 issued on Jan. 26, 2014 (11 pages).

(Continued)

*Primary Examiner* — James J Debrow
(74) *Attorney, Agent, or Firm* — Osha Liang LLP

(57) ABSTRACT

An electronic document display apparatus includes a display unit and an analysis-and-setting unit including a determination unit and a first correction unit. The display unit displays an electronic document in display layout set by the analysis-and-setting unit. If the determination unit determines that an image related to a display-range text of a display range to be displayed by the display unit is not included in the display range, the first correction unit adds an image display region where the image is displayed to the display range so as to correct the display layout in such a way that the image and at least a portion of an image text related to the image are included in the display range. The analysis-and-setting unit changes a display state of the image displayed in the image display region on the basis of a predetermined condition.

20 Claims, 17 Drawing Sheets

(58) Field of Classification Search
USPC .......................................................... 715/204
See application file for complete search history.

(56) References Cited

FOREIGN PATENT DOCUMENTS

| JP | 2008-135024 | 6/2008 |
| JP | 2011-154427 A | 8/2011 |
| JP | 2012-141703 A | 7/2012 |

OTHER PUBLICATIONS

Patent Abstracts of Japan, Publication No. 2012-141703 dated Jul. 26, 2012 (1 page).
Patent Abstracts of Japan, Publication No. 2011-154427 dated Aug. 11, 2011 (1 page).
Patent Abstracts of Japan, Publication No. 11-212982 dated Aug. 6, 1999 (1 page).

* cited by examiner

FIG.3A

OEBPS\stylesheet.css

```
/* Style Sheet */
body { margin-left: 5%; margin-right: 5%; margin-top: 5%; margin-bottom: 5%; text-align: left; }
h1 { text-align: center; }
h2 { text-align: center; }
br.sgc1 { font-weigt: bold; }
span.sgc2 { font-size: 80%; font-weight: normal; }
:
img.fig1
{
 float: left;
 width: 40%;
 margin-bottom: 1em;
}
:
img.fig4 { width: 474px; height: 332px; }
:
```

FIG.3B

OEBPS\document1.xhtml

```
:
<head>
<title> 第1章 </title>
<link href="stylesheet.css" type="text/css" rel="stylesheet" />
</head>
<body>
<div>
<h2> 第1章 </h2>
<p><img src="images/image1.jpeg" alt="図1" class="fig1"></p>
<p>初めに、第1章の例を示す。<a href="images/image1.jpeg" alt="図1" class="fig1">図1</a>は、第1章で最初に表示される図面である。この図に
:
```

*FIG.6A*  *FIG.6B*
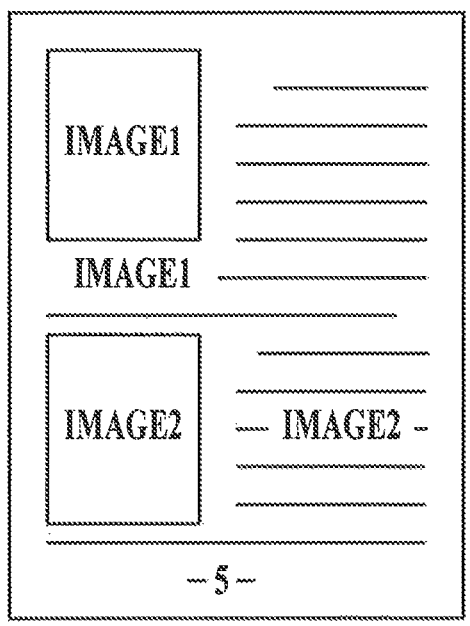
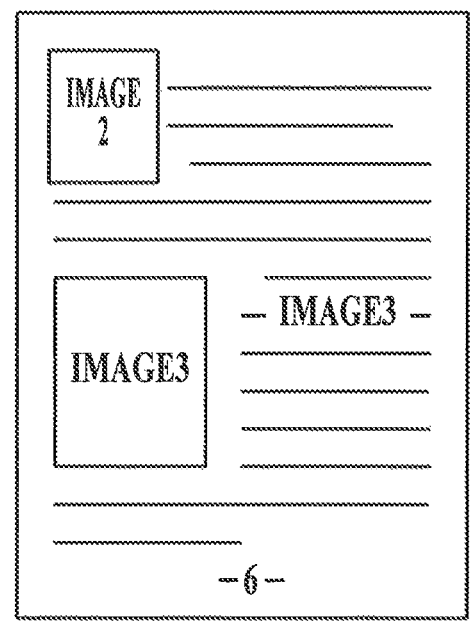

*FIG.8A*        *FIG.8B*
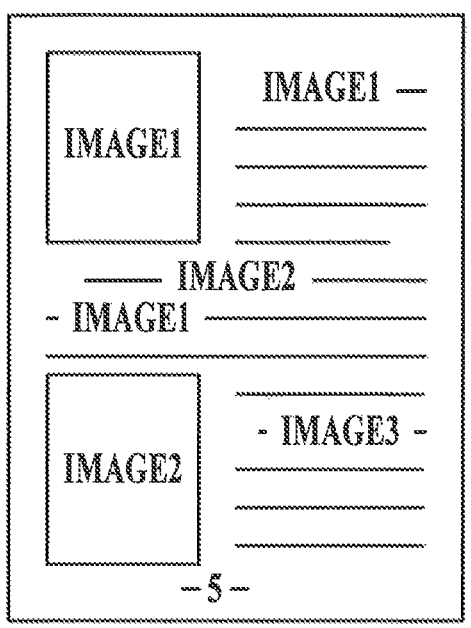
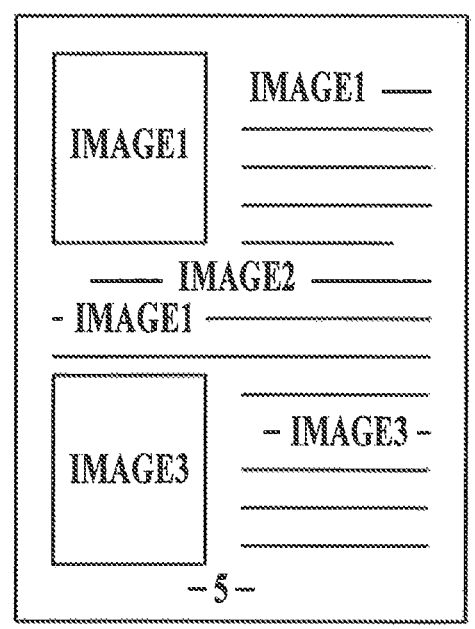

ELECTRONIC DOCUMENT DISPLAY APPARATUS, IMAGE PROCESSING APPARATUS, IMAGE OUTPUT METHOD, AND COMPUTER READABLE RECORDING MEDIUM STORING PROGRAM

BACKGROUND OF THE INVENTION

1. Field of the Invention

The present invention relates to an electronic document display apparatus, an image processing apparatus, an image output method, and a computer readable recording medium which stores a program therein.

2. Description of the Related Art

In recent years, there has been developed an electronic document display apparatus which can display electronic documents such as electronic books and electronic paper having digitalized text data and image data.

Examples of the electronic documents include an electronic document in PDF (Portable Document Format), which presets the whole layout, and an electronic document in EPUB (Electronic PUBlication) format, which holds only limited information, such as a display order of data, page breaks and starting points of paragraphs in accordance with a common format using XML (eXtensible Markup Language). When an electronic document display apparatus displays an electronic document in a format using XML, if a user changes a character size displayed on a display screen of the electronic document display apparatus to suit his/her preference, reflow is performed. The reflow is to appropriately adjust positions of line breaks, the number of lines displayed per screen and the like in accordance with the size of the display screen.

Because such change is flexibly dealt with, when a text and another element, such as an image, a figure, a title, a header or a footer, coexist in an electronic document in a format using XML, its layout may be completely different from what its creator expects. Then, in Japanese Patent Application Laid-Open Publication No, 2008-135024, an information processing apparatus is disclosed. The information processing apparatus performs display processing by which text display blocks and image display blocks are made, and a screen is divided, whereby a minimum layout setting can be made, and also a scaling can be performed on each block.

However, in a manual, a technical book or an academic book in particular, one image may be referred to multiple times (in a plurality of pages)), or a text including an explanatory note on one image (image text) may be longer than a text of a page (page text/display-range text) displayed as one page. In such a case, the electronic document display apparatus cannot display the image and the text (image text) related to the image on a display screen at the same time, which makes it inconvenient for a user to refer to the image.

BRIEF SUMMARY OF THE INVENTION

Objects of the present invention include providing an electronic document display apparatus, an image processing apparatus, an image output method, and a computer readable recording medium which stores a program therein, each of which can dispose an image in such a way as to be easily referred to when an image text related to the image is displayed.

In order to achieve at least one of the objects, according to a first aspect of the present invention, there is provided an electronic document display apparatus including: an analysis-and-setting unit which analyzes content of an electronic document including a text and an image, and sets display layout for the electronic document in accordance with a predetermined display format; and a display unit which displays the electronic document in the display layout set by the analysis-and-setting unit, the analysis-and-setting unit including: a determination unit which determines whether or not an image related to a display-range text of a display range to be displayed by the display unit is included in the display range; and a first correction unit which, in response to the determination unit determining that the image related to the display-range text is not included in the display range, adds an image display region where the image is displayed to the display range so as to correct the display layout in such a way that the image and at least a portion of an image text related to the image are included in the display range, wherein the analysis-and-setting unit changes a display state of the image displayed in the image display region on the basis of a predetermined condition.

In order to achieve at least one of the objects, according to a second aspect of the present invention, there is provided an image processing apparatus including: an analysis-and-setting unit which analyzes content of an electronic document including a text and an image, and sets output layout for the electronic document in accordance with a predetermined display format; and an output unit which outputs the electronic document in the output layout set by the analysis-and-setting unit on a predetermined output range basis, the analysis-and-setting unit including a determination unit which determines whether or not an image related to an output-range text of the output range to be outputted by the output unit is included in the output range; and a first correction unit which, in response to the determination unit determining that the image related to the output-range text is not included in the output range, adds an image display region where the image is displayed to the output range so as to correct the output layout in such a way that the image and at least a portion of an image text related to the image are included in the output range, wherein the analysis-and-setting unit changes a display state of the image displayed in the image display region on the basis of a predetermined condition.

In order to achieve at least one of the objects, according to a third aspect of the present invention, there is provided an image output method including: an analysis-and-setting step of analyzing content of an electronic document including a text and an image, and setting output layout for the electronic document in accordance with a predetermined display format; and an output step of outputting the electronic document in the output layout set in the analysis-and-setting step on a predetermined output range basis, the analysis-and-setting step including: a determination step of determining whether or not an image related to an output-range text of the output range to be outputted in the output step is included in the output range; and a first correction step of, in response to determining that the image related to the output-range text is not included in the output range in the determination step, adding an image display region where the image is displayed to the output range so as to correct the output layout in such a way that the image and at least a portion of an image text related to the image are included in the output range, wherein in the analysis-and-setting step, a display state of the image displayed in the image display region is changed on the basis of a predetermined condition.

In order to achieve at least one of the objects, according to a fourth aspect of the present invention, there is provided a computer readable recording medium storing a program allowing a computer including a display unit which displays an electronic document including a text and an image to function as an analysis-and-setting unit which analyzes content of the electronic document, and sets display layout for the electronic document in accordance with a predetermined display format; and a display output unit which displays the electronic document on the display unit in the display layout set by the analysis-and-setting unit the analysis-and-setting unit including: a determination unit which determines whether or not an image related to a display-range text of a display range to be displayed by the display unit is included in the display range; and a first correction unit which, in response to the determination unit determining that the image related to the display-range text is not included in the display range, adds an image display region where the image is displayed to the display range so as to correct the display layout in such a way that the image and at least a portion of an image text related to the image are included in the display range, wherein the analysis-and-setting unit changes a display state of the image displayed in the image display region on the basis of a predetermined condition.

BRIEF DESCRIPTION OF THE SEVERAL VIEWS OF THE DRAWING

The present invention is fully understood from the detailed description given hereinafter and the accompanying drawings, which are given by way of illustration only, and thus are not intended to limit the present invention, wherein:

FIG. 3A shows a portion of a style setting file of the EPUB file;

FIG. 3B shows a portion of a document data file of the EPUB file;

FIGS. 6A and 6B show a third image display example in the electronic document display apparatus;

FIGS. 8A and 8B show a fifth image display example in the electronic document display apparatus;

DETAILED DESCRIPTION OF THE INVENTION

Figure 1:
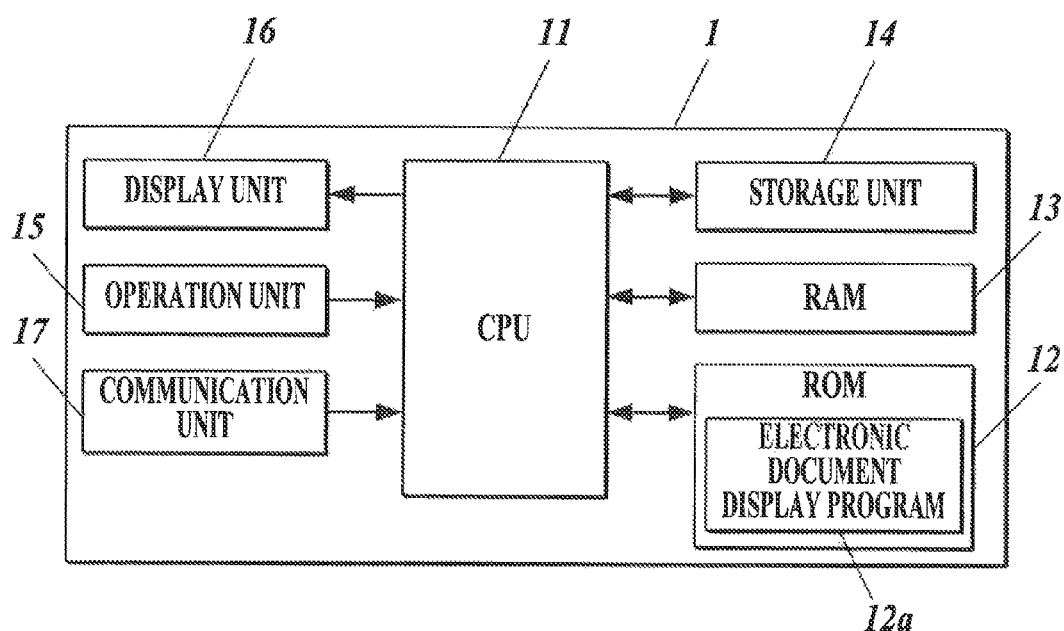
FIG. 1 is a block diagram showing an internal configuration of an electronic document display apparatus in accordance with an embodiment of the present invention.

In the following, an embodiment of the present invention is described referring to the drawings.

FIG. 1 is a block diagram showing an internal configuration of an electronic document display apparatus in accordance with an embodiment of the present invention.

Although not patricianly limited, an electronic document display apparatus 1 is a portable electronic book reader dedicated to reading electronic documents, for example.

The electronic document display apparatus 1 includes a CPU (Central Processing Unit) 11 (an analysis-and-setting unit, a determination unit, a first correction unit, a display selection unit, a switch control unit, a second correction unit, a display proportion calculation unit, a display control unit, an output unit, and a display output unit), a ROM (Read Only Memory) 12, a RAM (Random Access Memory) 13, a storage unit 14, an operation unit 15, a display unit 16, and a communication unit 17.

The CPU 11 controls operations of the electronic document display apparatus 1 overall. Furthermore, the electronic document display apparatus 1 executes an electronic document display program 12a stored in the ROM 12 so as to display a specified electronic document on the display unit 16.

Various control programs executed by the CPU 11 and initial setting data referred to by the control programs are stored in the ROM 12. The electronic document display program 12a is stored in the ROM 12 too. When a user reads an electronic document, the electronic document display program 12a is called (retrieved) from the ROM 12 so as to be executed. The electronic document display program 12a may be constituted of an electronic document output program to set layout for an electronic document, and a display program to display the electronic document on the electronic document display apparatus 1 on the basis of data for which the layout is set, and which is outputted from the electronic document output program.

The RAM 13 is constituted of a volatile memory to provide the CPU 11 with a memory space for work. Information on images displayed during execution of the electronic document display program 12a and positional information (display positions, display sizes, and the like) on the images are stored in the RAM 13 as temporary data.

The storage unit 14 is constituted of a nonvolatile memory where obtained electronic documents and information on bookmarks attached to the electronic documents and the like are stored. The storage unit 14 may be configured to have insertion slots for various portable recording media (a micro SD card, for example) in addition to the built-in nonvolatile memory so that the portable recording media are attachable; detachable to/from the storage unit 14 as external memories.

The operation unit 15 includes a plurality of push-buttons/switches. A user presses the push-buttons/switches so that an electronic document desired by the user is called, a page turning operation is performed, and a bookmark is attached to a page displayed on the display unit 16, for example.

The display unit 16 is constituted of a display to display content of an electronic document. For example, the display unit 16 is constituted of a display screen using electronic ink. Alternatively, a liquid crystal display may be used for the display unit 16. Alternatively, a liquid crystal display on which touch operations can be performed may be used for both the operation unit 15 and the display unit 16.

The communication unit 17 is constituted of an interface to communicate with an external apparatus via a communication line. The communication line applicable to the communication unit 17 is not limited to using a particular cable connection or wireless connection. For example, the communication unit 17 may be configured to perform wireless communications with a computer by using Bluetooth® or wireless LAN, or configured to directly connect to a website, where electronic books are sold, by utilizing a mobile phone line.

Next, data of an electronic document (electronic document data) displayable by the electronic document display apparatus 1 is described.

The electronic document display apparatus 1 of the embodiment can display a PDF file in which layout is preset and files in various formats used for electronic books such as an EPUB file.

Figure 2:
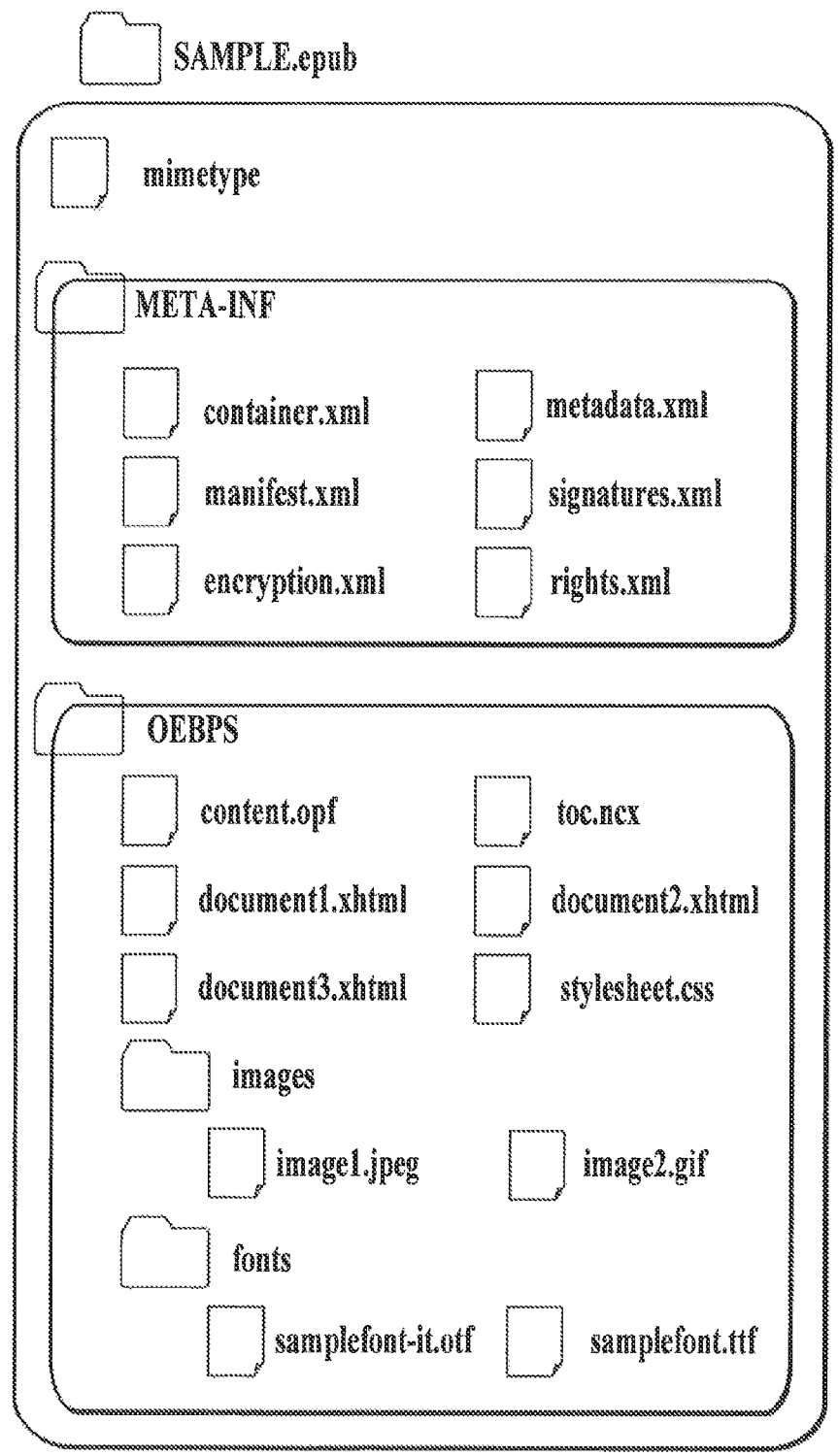
FIG. 2 shows a file structure of an EPUB file, the EPUB being one of electronic document formats.

FIG. 2 shows a file structure of an EPUE file.

An EPUE file is an archive file in which a plurality of files are compressed and stored in ZIP format. An EPUE file is constituted of a mimetype file, files stored in an META-INF folder, and files stored in an OEBPS folder. The mimetype file is not compressed, while the files stored in the META-INF folder and the files stored in the OEEPS folder are compressed.

Files (document data files) for content of an electronic document in EPUE format, files (image files) for images therein displayed with texts of the electronic document, and a file (style setting file) specifying display formats of the texts and the images are all stored in the DEEPS folder. File names of the files are not particularly limited. For example, in an electronic document file "SMFLE.epub" shown in FIG. 2, the document data files are named as "documentX.xhtml" (X=1, 2 and 3), the image files are named as "image1.jpeg" and "image2.gif" in a folder "images", and the style setting file is named as "stylesheet.css".

The document data files are described in a structured language XML (eXtension Markup Language). For example, the document data files are in XHTML (eXtensible HyperText Markup Language) format or HTML (HyperText Markup Language) format. The display formats of the texts described in the document data files and the images read therein are described in the style setting file "stylesheet.css".

Data of the images (image data) read in and called by the document data files are image data in formats which the electronic document display apparatus 1 can decode to display. Examples of the image data formats which the electronic document display apparatus 1 of the embodiment can display include GIF format, JPEG format and PNG format.

FIG. 3A shows a portion of content of the style setting file in the SAMPLE.epub file as an example. FIG. 3B shows a portion of content of a document data file in the SAMPLE.epub file as an example.

As shown in FIG. 3A, the style setting file "stylesheet.css" is a style sheet in which various settings for displaying texts and images are described. As an image display setting for an image "fig1", it is described that the image "fig1" is left-aligned, the display size thereof is 40% of the display screen in width, and the bottom margin of the image is 1 em. As an image display setting for an image "fig4", it is described that the display size thereof is fixed with a width of 474 px and a height of 332 px.

As shown in FIG. 3B, in the document data file "document1.xhtml", content of a text actually displayed is described, and a description to display a figure is included in the content of the text by using an image tag <img> (display command). A class "fig1" is set in the image tag for the image file "images/image1.jpeg" to be displayed as "▨ 1 (FIG. 1)" Consequently, the image display setting for the image "fig1" described in the style setting file is applied to the image file "images/image1.jpeg". In an EPUB file, the display positions or display arrangement (display layout) for images are determined on the basis of these descriptions so that the images are displayed on the display unit 16.

Next, a setting to set the display positions (display layout) for images made by the electronic document display apparatus 1 of the embodiment is described.

Figure 4A:
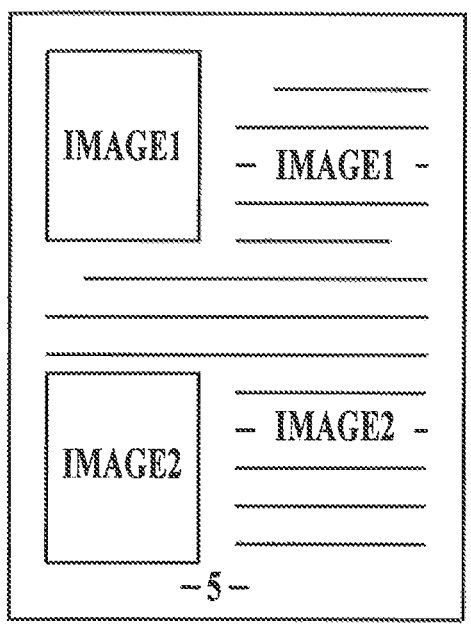
FIGS. 4A and 4E show a first image display example in the electronic document display apparatus.
Figure 4B:
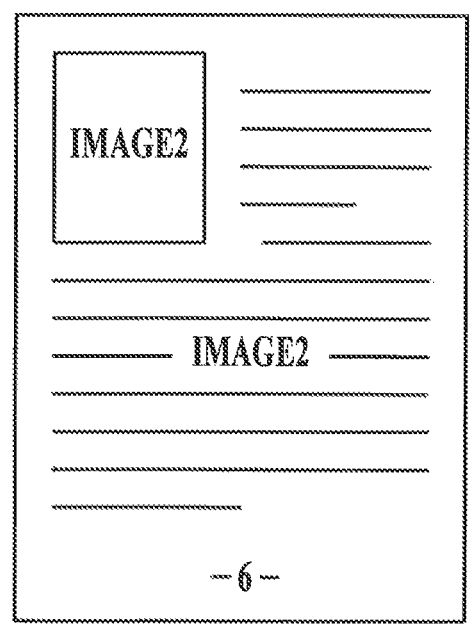

FIGS. 4A and 4B show a first example of images displayed (image display example) in the electronic document display apparatus 1.

When display commands for two images (images 1 and 2), which make the images display target images, exist in a display-range text of a display range (page 5) according to analysis of a document data file, as shown in FIG. 4A, image display regions to display these two images left-aligned are secured on the basis of the descriptions in the style setting file (style sheet). When the next display range (page 6) is to be displayed, and it is detected that the image 2 is mentioned in page 6 too, the electronic document display apparatus 1 of the embodiment makes the image 2 a display target image, and, as shown in FIG. 4B, inserts an image display region where the image 2 is displayed into page 6 so as to display the image 2 in page 6 too.

Figure 5A:
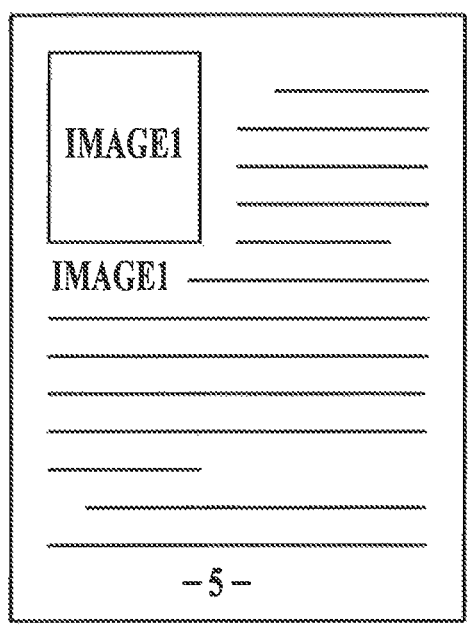
FIGS. 5A and 5B show a second image display example in the electronic document display apparatus.
Figure 5B:
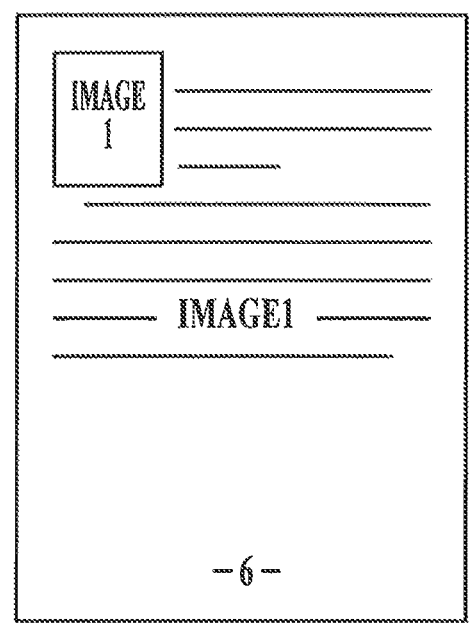

FIGS. 5A and 5B show a second image display example in the electronic document display apparatus 1.

As shown in FIG. 5A, when, after the image 1 is displayed in a display range (page 5), the image 1 is mentioned in the following display range or ranges (page 6) too, as is the case with the first image display example, the image 1 is displayed in page 6 too. However, as shown in FIG. 5B, in the second image display example, when the same image is displayed for the second time and thereafter, the size of the image display region where the image is displayed is reduced to be smaller than the size of the image display region which is secured when the image is displayed for the first time so that the display size of the image displayed for the second time and thereafter is smaller than the display size of the image displayed for the first time. It is preferable that a reduction percentage to reduce an image display region is a percentage with which content of an image displayed in the image display region can be recognized, and also the image display region does not occupy a large area of the display screen even when the image display region is repeatedly displayed. For example, the maximum reduction percentage (the degree of reduction is small) can be set on the basis of the size of the display screen of the display unit 16 of the electronic document display apparatus 1, and the minimum reduction percentage (the degree of reduction is large) can be set on the basis of the original (normal) size of the image display region which is secured when the image is displayed for the first time. The image made smaller can be displayed with the original display size again on the basis of an operation input (instruction) onto the operation unit 15 by a user, for example.

FIGS. 6A and 6B show a third image display example in the electronic document display apparatus 1.

As is the case with the second image display example shown in FIGS. 5A and 5B, as shown in FIG. 6A, the images 1 and 2, the display commands for which are included in the display-range text of page 5, are displayed in page 5. Then, when it is determined that the image 2 displayed in page 5 is mentioned in page 6 too, as shown in FIG. 6B, the display size of the image 2 is reduced (namely, the size of the image display region for the image 2 in page 6 is reduced) so that the image 2 is displayed in page 6 too, and an image 3, the display command for which is included in page is displayed in page 6 with the normal display size.

In the electronic document display apparatus 1, the determination whether or not the image 2 the display command for which is included in a display range (page 5), is mentioned in another display range (page 6) is made on the basis of determination whether or not wording explicitly indicating the image 2, such as "the image 2", is detected from page 6, and/or on the basis of determination whether or not a paragraph which includes such explicit wording continues from the previous page (page 5) to the current page (page 6) and/or from the current page (page 6) to the next page (page 7) The determination whether or not the image 2 is mentioned in page 6, and whether or not the image 2 is to be displayed in page 6 by extension, may be made on the basis of the degree of similarity or the degree of correlation between wording described in a paragraph in a display range (page 5), the paragraph including the display command for the image 2, and wording included in a display-range text of another display range (page 6). In FIG. 6E, it is determined that a paragraph in which the image 2 is clearly mentioned (in which the display command for the image 2 is also included, in this example) continues to page 6, so that the display size of the image 2 is reduced so as to be displayed in page 6.

Figure 7A:
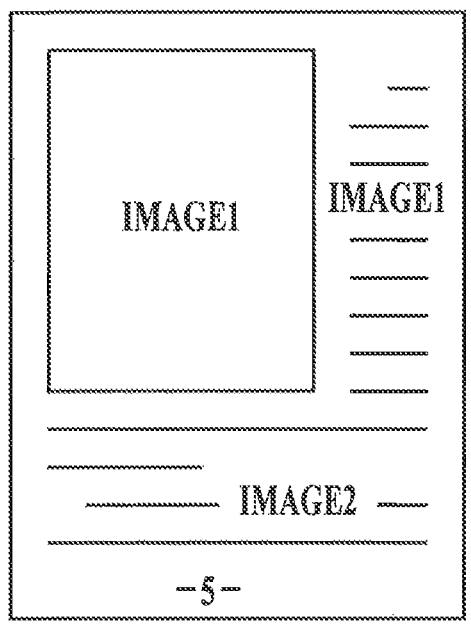
FIGS. 7A and 7B show a fourth image display example in the electronic document display apparatus.
Figure 7B:
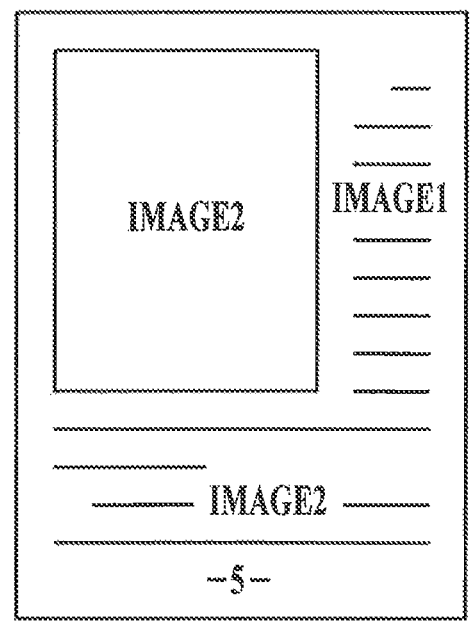

FIGS. 7A and 7B show a fourth image display example in the electronic document display apparatus 1.

When display commands for a plurality of images (images 1 and 2) are included in one display range (page 5), but it is difficult to display the images at the same time because the display sizes of the images are too large compared with the size of the display screen of the display unit 16, the electronic document display apparatus 1 detects such a case on the basis of a predetermined condition, and, at predetermined time intervals or on the basis of an operation input onto the operation unit 15 by a user, can alternately display the images 1 and 2 in one image display region by switching display states respectively shown in FIGS. 7A and 73.

FIGS. 8A and 8B show a fifth image display example in the electronic document display apparatus 1.

The fifth image display example is further generalized from the fourth image display example shown in FIGS. 7A and 7B. In the fifth image display example, the maximum proportion (a predetermined proportion) of the total size of image display regions to the size of the display screen of the display unit 16 is predetermined. When the total size of the image display regions for images (images 1, 2 and 3) as display target images, namely, the total display size of the images, is larger than the size of a maximum image display region settable on the display screen of the display unit 16, the electronic document display apparatus 1 can first display some images of the images in an available image display region in order of appearance, the images which can be displayed within the size of the available image display region, and then display the remaining images of the images in the available image display region by switching display states at predetermined time intervals or on the basis of an operation input onto the operation unit 15 by a user. For example, when three images, the images 1, 2 and 3, are display target images in one display range (page 5), but only two images can be displayed in the available image display region at the maximum, as shown in FIG. 8A, the images 1 and 2 which appear earlier in the display-range text of the display range (page 5) are displayed in the available image display region first, and after that, as shown in FIG. 8B, the images 1 and 3 are displayed in the available image display region, by switching the display states shown in FIGS. 8A and 8B.

In this example, because the image 1 is mentioned again between the display command for the image 2 and the display command for the image 3 in the display-range text to be displayed on the display screen of the display unit 16, the images are not simply displayed in the order of the image 1, the image 2, and then the image 3 by switching display states, but the image 1 is displayed for the second time between the image 2 and the image 3. The display size of the image 2 may be reduced to be displayed for the second time, or the normal display size thereof may be kept to be displayed for the second time too so that the display position of the display-range text (display positions of the image texts) is unchanged. Furthermore, the display position and the display size of the image 1 displayed for the first time may be stored with identification information (a file name, for example) on the image 1 in the RAM 13, so that the image 1 may be displayed at the same display position with the same display size when being displayed for the second time (page 6).

In the electronic document display apparatus 1, even when all images related to a display-range text of a display range (one page) can be displayed in the display range at the same time, simultaneous display or successive display can be selected on the basis of an operation input onto the operation unit 15 by a user. In the simultaneous display, all the images are displayed at the same time. In the successive display, the images are displayed by turns by switching display states.

Figure 9A:
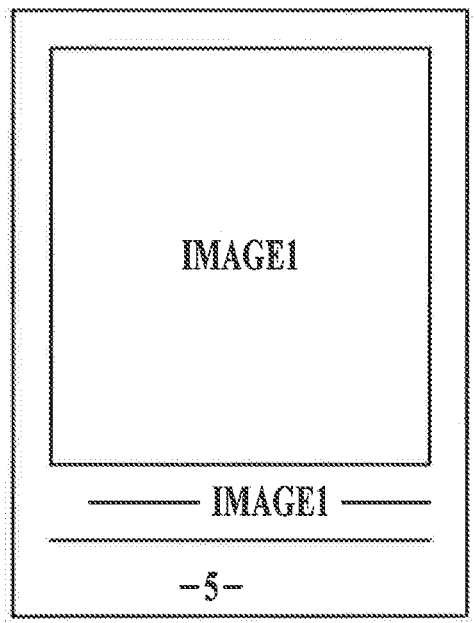
FIGS. 9A and 9E show a sixth image display example in the electronic document display apparatus.
Figure 9B:
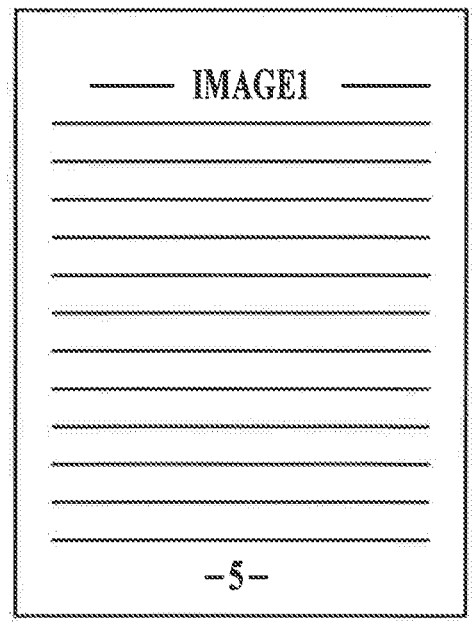

FIGS. 9A and 9B show a sixth image display example in the electronic document display apparatus 1.

There is a case where because the display size of an image (image 1) to be displayed in a display range (one page) is too large compared with the size of the display screen of the display unit 16, if the image 1 is displayed, a text cannot be displayed almost at all. In such a case, if the image 1 keeps being displayed until the end of an image text related to the image 1, for example, the end of a paragraph which includes an explanatory note on the image 1, is displayed, the page turning operation needs to be performed many times. Hence, in the electronic document display apparatus 1, for example, the image 1 can be temporarily removed from the display screen of the display unit 16 by switching display states shown FIGS. 9A and 9B on the basis of an operation input onto the operation unit 15 by a user. Alternatively, the image 1 may be automatically removed from the display screen of the display unit 16 after the display range (page 5) is displayed on the display screen thereof for a predetermined period of time.

Figure 10A:
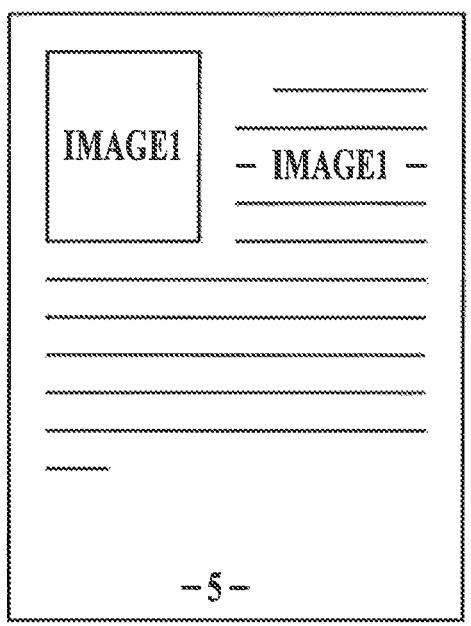
FIGS. 10A and 10B show a seventh image display example in the electronic document display apparatus.

FIGS. 10A and 103 show a seventh image display example in the electronic document display apparatus 1.

Figure 10B:
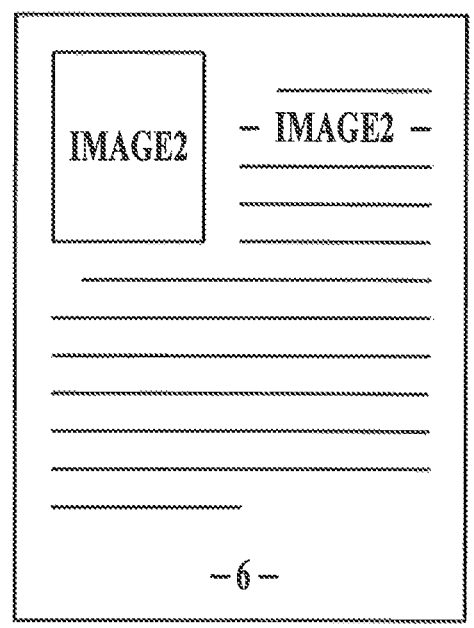

There is a case, as is the case with the first image display example, display commands for two images (images 1 and 2) exist in a display range (page 5), so that the two images, the images 1 and 2, are display target images in page 5, but a proportion of an amount of an image text, which includes an explanatory note on the last image (image 2), in page 5 to an amount of the whole display-range text of page 5 is equal to or less than a predetermined proportion, or an amount (the number of characters/words) of the image text, which includes an explanatory note on the image 2, in page 5 is equal to or less than a predetermined amount (value). In such a case, a page break can be inserted in front of a starting point of the image text related to the image 2 so that the display layout is changed in such a way that neither the image text related to the image 2 nor the image 2 is displayed in page 5 as shown in FIG. 10A, but both the image text related to the image 2 and the image 2 are displayed on the top of the next page (page 6) as shown in FIG. 10B. Furthermore, there is a case where because an image display region where the image 2 is displayed is inserted into page 5, the image text related to the image 2 cannot be displayed in page 5. In such a case too, a page break can be inserted in front of a starting point of the image text related to the image 2 so that the display layout is changed in such a way that both the image text related to the image 2 and the image 2 are displayed at the same time in page 6.

Figure 11A:
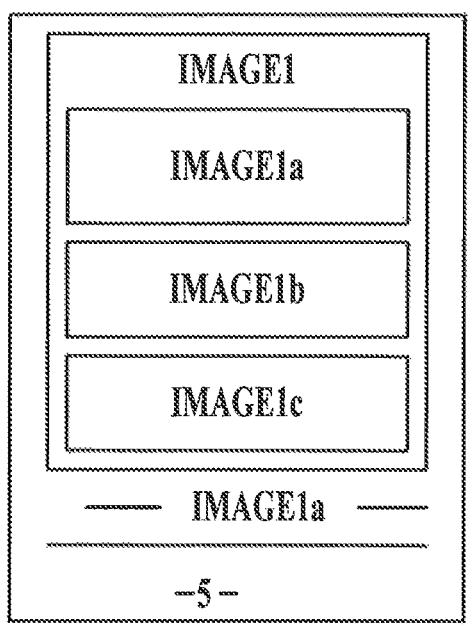
FIGS. 11A and 11B show an eighth image display example in the electronic document display apparatus.
Figure 11B:
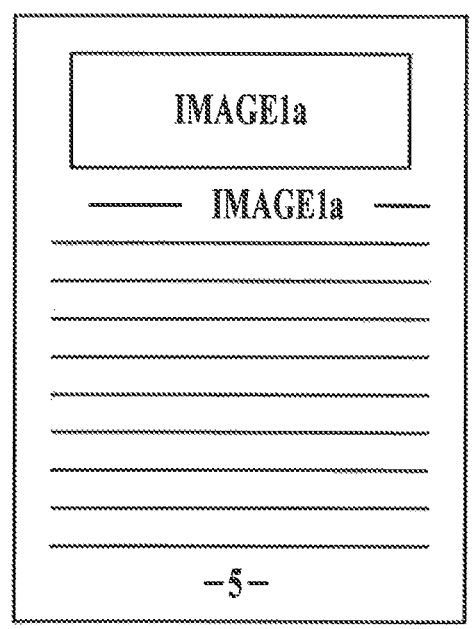

FIGS. 11A and 11B show an eighth image display example in the electronic document display apparatus 1.

There is a case where an image which can be divided into a plurality of segments, for example, an image including a plurality of panels, is a display target image. In such a case, when a display-range text of a display range includes a text (partial image text) including an explanatory note only on one or some of the segments of the image, the segment (or segments) related to the text can be trimmed from the image so as to be displayed by storing the positional information on each segment of the image in the RAM 13 or the like in advance. For example, in a case where the image 1 can be divided into three segments, images 1a, 1b and 1c, and only the image 1a is mentioned in the display range text of the display range, at first, the whole image 1 is displayed on the display unit 16 as shown in FIG. 11A, and after that, only the image 1a is extracted from the image 1 so as to be displayed on the display unit 16 as shown in FIG. 11B. Accordingly, a text display region where a text is displayed can be sufficiently ensured.

Figure 12A:
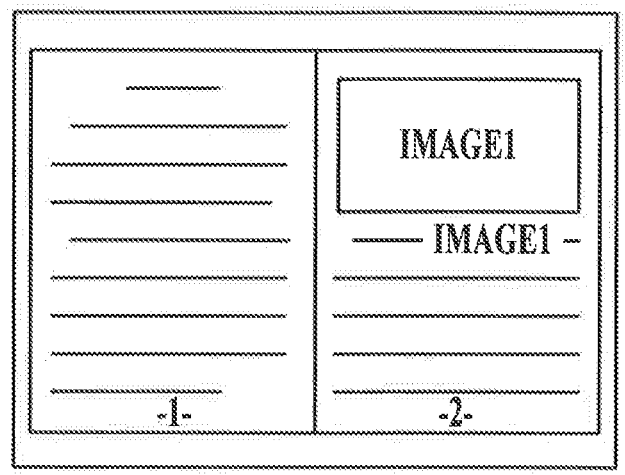
FIGS. 12A to 12C show a ninth image display example in the electronic document display apparatus.
Figure 12B:
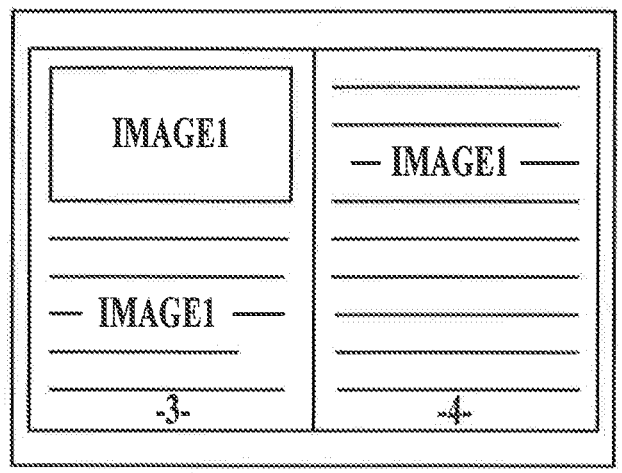
Figure 12C:
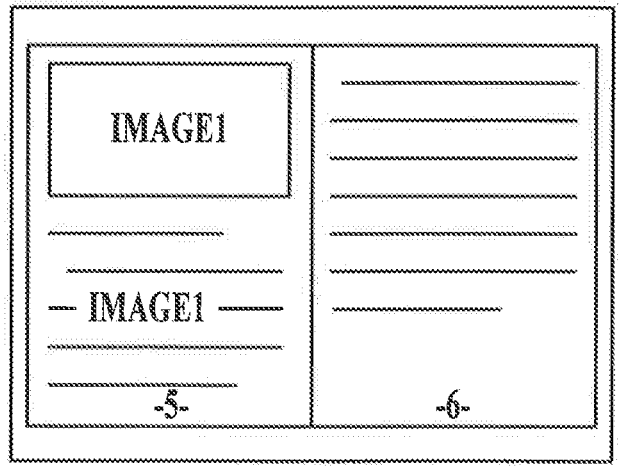

FIGS. 12A to 12C show a ninth image display example in the electronic document display apparatus 1.

As shown in FIGS. 12A to 12C, in the electronic document display apparatus 1, an electronic document can be displayed in columns which are the same as two pages being spread (a two-page spread). In such a case, each image mentioned in a display-range text of two pages (a display range), which are spread, is displayed once in the two pages. For example, in a case where an image text related to the image 1 continues from page 2 to page 5, the image 1 is displayed in page 2, page 3 and page 5, so that one image 1 is always displayed on the display unit 16 while the image text related to the image 1 is displayed thereon.

Figure 13A:
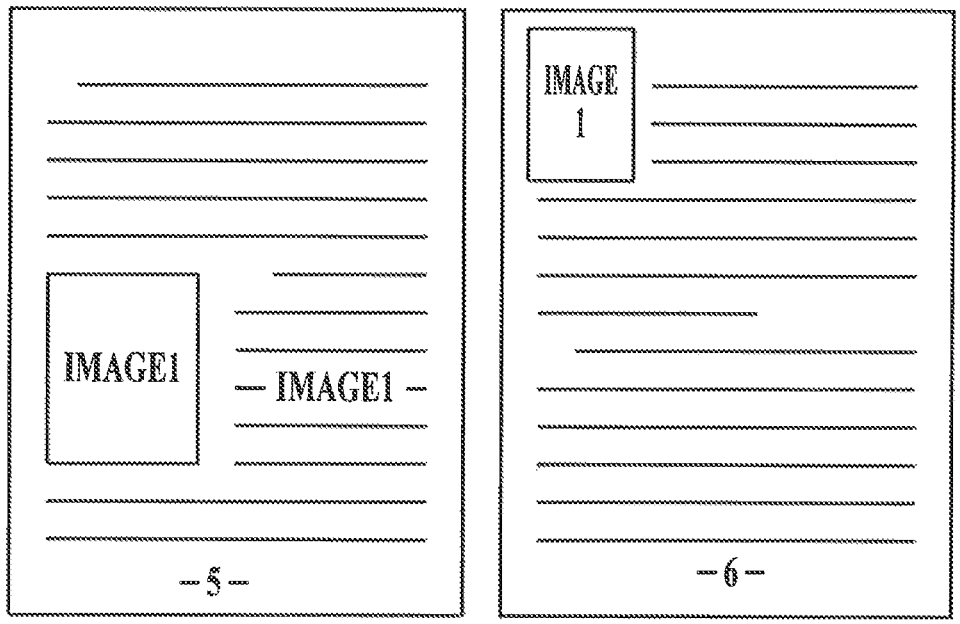
FIGS. 13A and 13B show a tenth image display example in the electronic document display apparatus.
Figure 13B:
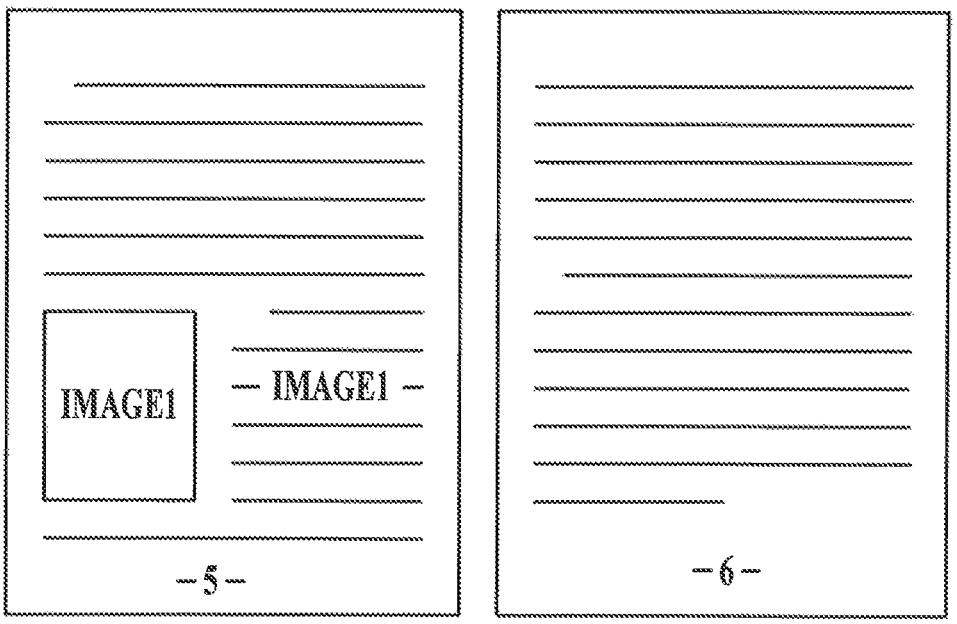

FIGS. 13A and 13B show a tenth image display example in the electronic document display apparatus 1.

In the electronic document display apparatus 1 of the embodiment, when the image text related to the image 1 continues from page 5 to page 6, the image 1 is displayed in page 6 too as shown in FIG. 13A. In FIG. 13A, as is the case with the second image display example, the image 1 is reduced to be displayed for the second time (page 6). However, there is a case where an image does not need to be displayed in a plurality of pages, such as an illustration in a novel. In such a case, in the electronic document display apparatus 1, as shown in FIG. 13B, the image (image 1) can be removed from the display unit 16 from the second time the image is displayed (page 6) on the basis of an operation input onto the operation unit 15 by a user.

Figure 14:
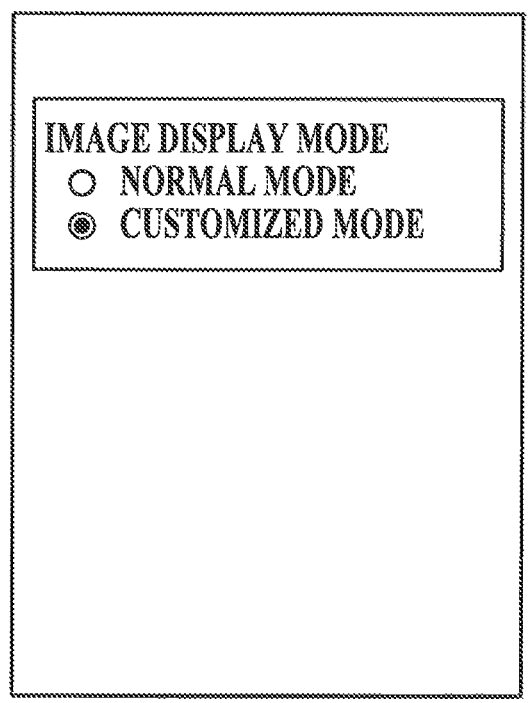
FIG. 14 shows a selection screen to select an image display mode.

FIG. 14 shows an example of a selection screen to select an image display mode. The selection screen is displayed on the display unit 16.

When the selection screen is displayed on the display unit 16, a user performs an operation input onto the operation unit 15 so as to select a normal mode or a customized mode as the image display mode. When the customized mode is selected as the image display mode, as shown in FIG. 13A, while the image text related to the image (image 1) continues over a plurality of pages, the image is displayed in the plurality of pages. On the other hand, when the normal mode is selected as the image display mode, as shown in FIG. 13B, the image is displayed only at a part of a display-range text of a page, the part which includes a display command for the image.

Next, operations to display an electronic document Performed by the electronic document display apparatus 1 having the above-described image display function are described.

Figure 15:
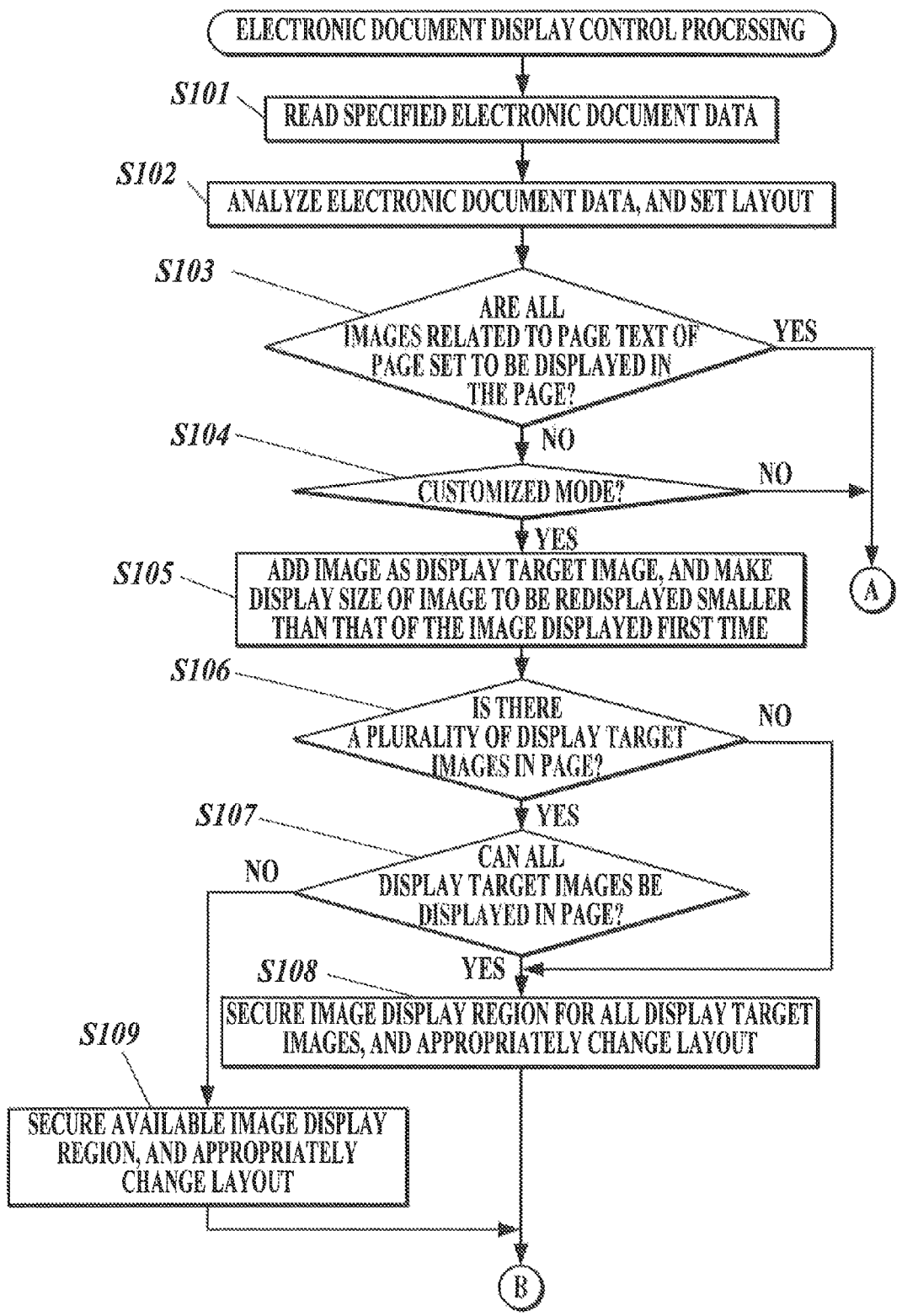
FIG. 15 is a first part of a flowchart showing a control procedure of electronic document display control processing.
Figure 16:
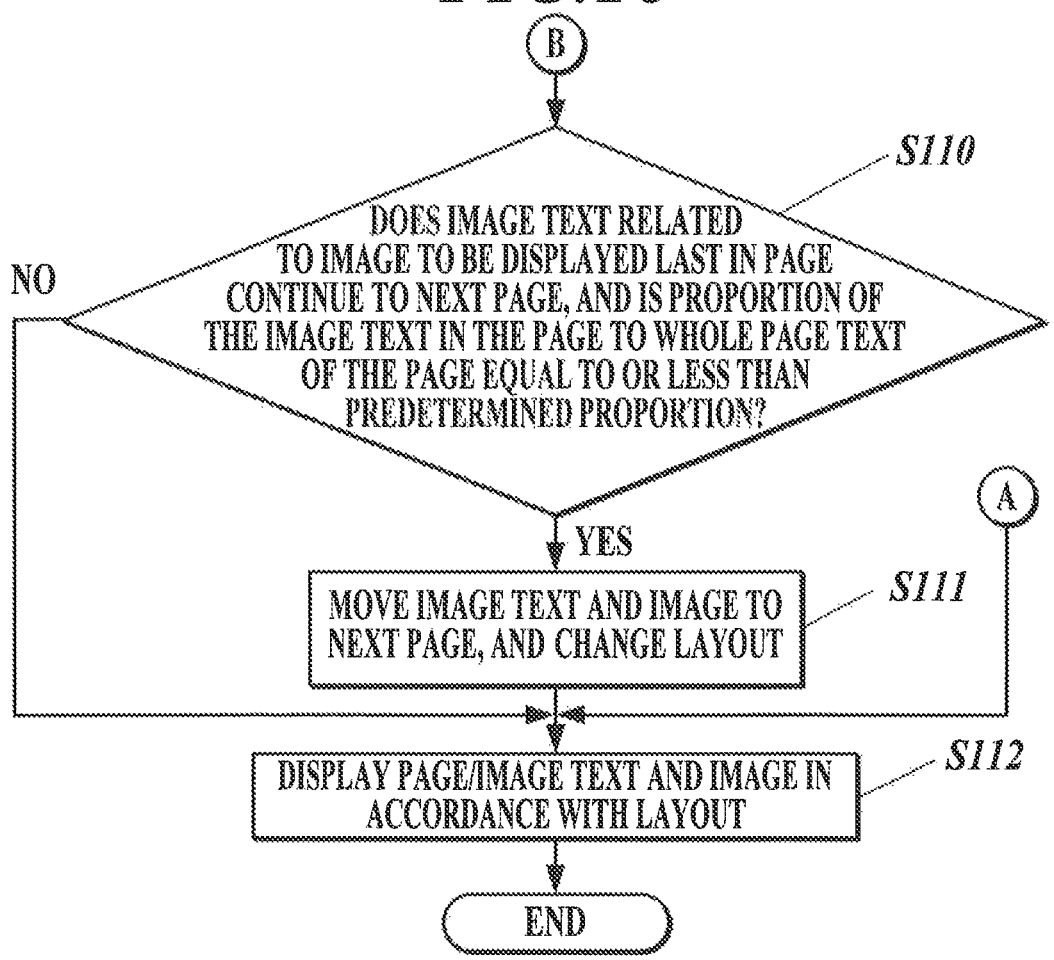
FIG. 16 is a second part of the flowchart showing the control procedure of the electronic document display control processing.

FIGS. 15 and 16 show a flowchart showing a control procedure of electronic document display control processing performed by the CPU 11 of the electronic document display apparatus 1.

The electronic document display control processing is started when a display operation for a specified page (pages) of a specified electronic document is inputted by a user.

When the electronic document display control processing is started, the CPU 11 first reads (retrieves) electronic document data on the specified electronic document (Step S101). Then, the CPU 11 analyzes, of the electronic document data, page data on the specified page, and sets layout (display layout) for the page data (display range) in a conventional manner (in the normal mode) (Step S102).

Next, the CPU 11 determines whether or not images related to a display-range text of the display range for which the display layout is set are included in the display range (Step S103). More specifically, the CPU 11 detects all the images related to the display-range text of the display range from the display-range text. Then, the CPU 11 determines whether or not all the detected images are included in the display range in the display layout which is set on the basis of only display commands for images included in the electronic document data. When determining that all the images related to the display-range text are included in the display range in the display layout (Step S103; YES), the CPU 11 proceeds to Step S112.

On the other hand, when determining that not all the images related to the display-range text are included in the display range in the display layout (Step S103; NO), the CPU 11 proceeds to Step S104. The CPU 11 determines that not all the images related to the display-range text are included in the display range in the display layout when an image text related to an image already displayed in a previous display range (page) is included in the display-range text of the current display range (page), or when an image related to the display-range text of the current display range is not included in the current display range, namely, when the image is included in a next display range (page) or thereafter.

At Step S104, the CPU 11 determines whether or not a setting to display all the images mentioned in (related to) the display-range text of the display range in the display range is made, namely, determines whether or not the customized mode is selected as the image display mode. When determining that the customized mode is selected as the image display mode (Step S104; YES) the CPU 11 adds the image (or images), which is not included in the display range in the normal mode, as a display target image to the display range, and, of the display target images, makes the display size of the display target image (i.e. the image display region where the display target image is displayed) to be displayed not for the first time smaller than the display size thereof displayed for the first time (Step S105). Then, the CPU 11 proceeds to Step S106. On the other hand, when determining that the customized mode is not selected as the image display mode (Step S104; NO), the CPU 11 proceeds to Step S112.

At Step S106, the CPU 11 determines whether or not a plurality of display target images exists in the display range (Step S106). When determining that a plurality of display target images exists in the display range (Step S106; YES), the CPU 11 determines whether or not all the display target images are set to be displayed in the display range (Step S107). When determining that all the display target images are set to be displayed in the display range (Step S107; YES), the CPU 11 secures image display regions for all the display target images in the display range, and appropriately changes the display layout, which is initially set (Step S108). Then, the CPU 11 proceeds to Step S110. When determining that only one display target image exists in the display range (Step S106; NO), the CPU 11 proceeds to Step S108, and secures an image display region for the one display target image in the display range, and appropriately changes the display layout, which is initially set (Step S108). Then, the CPU 11 proceeds to Step S110.

When determining that not all the display target images are set to be displayed in the display range, namely, determining that the total display size of the display target images (the total size of the image display regions) is larger than the size of the maximum image display region, which is set on the basis of the size of the display screen of the display unit 16 (Step S107; NO), the CPU 11 secures an image display region (or regions) (an available image display region) within the maximum image display region, and appropriately changes the display layout, which is initially set, on the basis of the secured available image display region (Step S109). At the time, the CPU 11 also sets a display order to display the display target images in the secured available image display region. Then, the CPU 11 proceeds to Step S110.

At Step S110, the CPU 11 determines whether or not a first condition is satisfied, the first condition that an image text related to an image to be displayed last in the current display range (page) in the display layout, which is appropriately changed at Step S108 or S109, continues to the next display range (page), and also determines whether or not a second condition is satisfied, the second condition that a proportion of the image text related to the image to be displayed last in the current page to the whole display-range text of the current page is equal to or less than a predetermined proportion. When determining that the first condition and/or the second condition are not satisfied (Step Silo; NO), the CPU 11 proceeds to Step S112. On the other hand, when determining that both the first condition and the second condition are satisfied (Step S110; YES), the CPU 11 inserts a page break in front of a starting point of the image text related to the image to be displayed last in the current page so as to move the image text related to the image and the image to the next page (Step S111). Then, the CPU 11 proceeds to Step S112.

At Step S112, the CPU 11 displays the specified page on the display unit 16 in accordance with the settings made on the basis of the operation inputs onto the operation unit 15 by a user or the like, and the display layout, which is appropriately changed. Then, the CPU 11 ends the electronic document display control processing.

Next, an output setting to output the content a printer so as to print the content thereby is described. The content is displayed on the display unit 16, and outputted from the electronic document display apparatus 1 to the printer.

FIGS. 17A to 17D show an image printing example in a case where display content are printed on paper in a booklet setting.

When two-page spread booklet printing based on display data of an electronic document from the electronic document display apparatus 1 is performed on recording paper by using a printer, output layout is set for the electronic document. The output layout is set in such a way as not to include a text of two pages which are printed on one face of a sheet of paper, and images related to the text, in one output range, but to include a text of two pages (an output range, in this example) which are spread when the booklet is read, and images related to the text, in one output range. For example, in a case where a booklet has six pages, page 2 and page 3 constitutes a spread, and page 4 and page 5 constitutes another spread. When an electronic document similar to the image display example 9 shown in FIGS. 12A to 12C is printed, because the image text related to the image 1 continues from page 2 to page 5, the image 1 is displayed on page 2 and page 4.

Figure 17A:
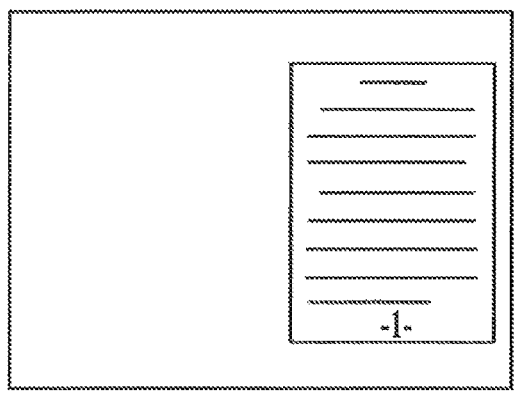
FIGS. 17A to 17D show an image printing example in a case where an electronic document is printed in a booklet setting from the electronic document display apparatus.
Figure 17B:
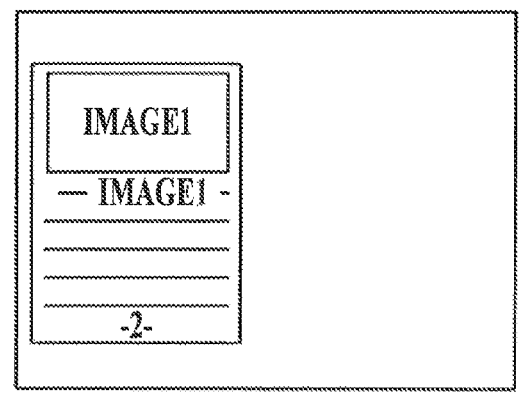
Figure 17C:
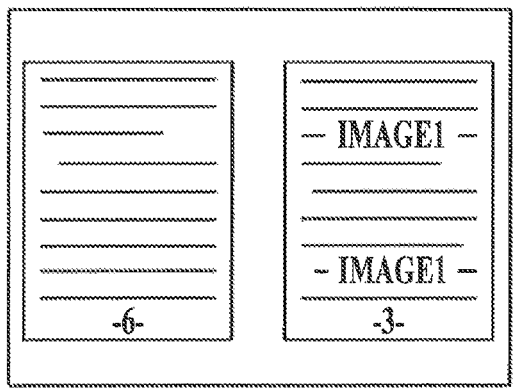
Figure 17D:
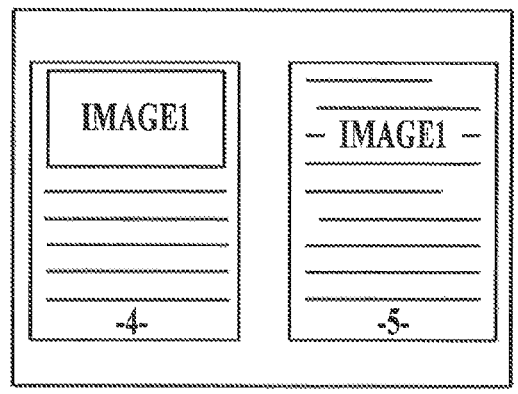

That is, as shown in FIGS. 17A and 17B, page 1 is printed on the front face of the first sheet of recording paper, and page 2 including the image 1 is printed on the back face thereof. In addition, as shown in FIGS. 17C and 17D, page 6 and page 3 are printed on the front face of the second sheet of the recording paper, and page 4 including the image 1 and page 5 are printed on the back face thereof.

As described above, according to the electronic document display apparatus 1 of the embodiment, when an electronic document including text data and image data is displayed on the display screen of the display unit 16, content of an EPUB file, which is electronic document data, is analyzed, and the display layout is set. At the time, it is determined whether or not an image related to a display-range text of a display range to be displayed on the display screen is included in the display range. When it is determined that the image related to the display-range text is not included in the display range, the image is added to the display range. Consequently, the display layout is set to always display the image related to the display-range text of the display range in the display range. Accordingly, a user can read a text and refer to an image related to the text at the same time. Hence, user's trouble with setting a bookmark or following a link in order to go back and forth between screens can be saved, so that a user can easily read an electronic document.

Furthermore, when an image text related to an image spans a plurality of display ranges, and hence the image is displayed multiple times, the display size of the image is appropriately reduced from the second time the image is displayed. Accordingly, while unnecessary reduction of the text display region is displayed is avoided, a necessary image can be referred to.

Furthermore, when the display size of an image is too large compared with the size of the display screen of the display unit 16, the display size of the image is reduced to a proper display size thereof so that the image is displayed, and, only when it is necessary, can be enlarged. Accordingly, the display layout can be set in such a way that while an image indicated by an image text can be always referred to, the text display region is displayed is not pressed by the image.

Furthermore, when image texts respectively related to images are included in one display range, the simultaneous display in which all the images are displayed or the successive display in which the images are displayed by turns by switching display states as needed can be selected. Accordingly, the display layout can be set in such a way that while a necessary image and an image text related to the image are displayed in the same display range at the same time, the text display region is not pressed by many images.

Furthermore, the display layout shown on the display screen can be selectively changed by appropriately determining whether the simultaneous display is necessary or the successive display is sufficient.

In particular, by the successive display, images displayed on the display screen can be changed on the basis of an operation input onto the operation unit by a user. That is, a user can selectively display a necessary image and an image text related to the image together on the display screen at his/her necessary timing.

Alternatively, by the successive display, when a user's reading speed to read an electronic document is somewhat fixed, images may be automatically changed at preset time intervals. Accordingly, a user does not need to perform additional operations, and can read an electronic document while comfortably referring to necessary images.

Furthermore, when image texts respectively related to images are included in one display range, the amount of an image text appearing last in the display range is calculated. When the amount of the image text appearing last in the display range is equal to or less than a predetermined amount, the display layout can be changed by inserting a page break so as to display the image text in the next display range (page), without forcing the image text to be included in the display range. Accordingly, continuously displaying images jammed into one display screen (display range) can be avoided.

Furthermore, in the electronic document display apparatus 1, whether to add an image not included in a display range to the display range or to move an image text related to the image included in the display range to the next display range is automatically determined on the basis of a predetermined condition. Accordingly, a proper display state (or display mode) can be selected without having a user perform extra operations, and hence a user can comfortably read an electronic document.

Furthermore, when a user does not need to refer to an image any longer, the image can be removed from the display screen of the display unit 16. Accordingly, the number of times the page turning operation is performed can be prevented from increasing, which happens when the image keeps being displayed in a plurality of display ranges, and accordingly an image text related to the image is displayed only little by little.

Furthermore, removal of such an image from the display screen of the display unit 16 is automatically performed after the image is displayed for a predetermined period of time. Hence, it is unnecessary for a user to perform a removal operation. Furthermore, even if an image is once removed or reduced, when a user needs to refer to the image again, the image can be called and displayed again. Accordingly, a situation can be avoided, the situation in which once an image is removed from the display screen of the display unit 16, a user needs to use another way, such as following a link, in order to refer to the image again.

Furthermore, the display position and the display size of an image displayed for the first time are stored. Accordingly, the image can be displayed again at the same position and/or with the same display size, and hence a user can refer to the image without feeling uncomfortable.

Furthermore, in the electronic document display apparatus 1, an electronic document having preset display layout, such as a PDF file, can be displayed too. In the electronic document display apparatus 1, whether or not an electronic document is a document, the display layout of which can be set, is automatically determined, and only when the electronic document is the document, the display layout of which can be set, the display layout is set for the electronic document. Accordingly, user's trouble with performing an operation to make the determination can be saved.

Furthermore, in the electronic document display apparatus 1 an image text related to an image is a text of a paragraph in which a display command for the image is included or a text of a paragraph in which the image is clearly mentioned. Accordingly, a necessary image can keep being displayed in proper display ranges without putting a heavy load on the electronic document display apparatus 1, the load to determine whether or not to display the image.

Furthermore, when an electronic document described above is printed on paper, even if it is multiple-page layout printing by which a plurality of pages is arranged in one page or booklet printing by which pages are printed in an order different from an order of pages to seen when the booklet is read, the display layout can be set in such a way as to include each necessary image in each spread. Accordingly, when an electronic document printed on paper is read too, a user can read the printed electronic document while referring to images and image texts respectively related to the images at the same time.

The present invention is not limited to the embodiment, and hence can be variously modified.

For example, in the embodiment, an electronic document is displayed on the display screen of the display unit 16 in such a way as to separate pages thereof from each other. However, the present invention is applicable to a case where an XHTML file or an HTML file is displayed as an electronic document, and regardless of pages, the electronic document is displayed on the display screen thereof on a display range basis, the display range which is a range displayable on the display screen starting from a starting point of the electronic document, the starting point being specified on the basis of an operation input onto the operation unit 15 by a user.

Furthermore, in the embodiment, with respect to each of the display ranges (pages) to be displayed on the display screen, starting from the first display range (page), a display-range text thereof and images related to the display-range text are detected, and when an image (or images) related to the display-range text is not included in the display range, the image is added as a display target image to the display range, whereby the display layout for the display range (page) is determined. Alternatively, it is possible that, each time a display command for an image is detected, whether or not an image text related to the image exists in the following (remaining) texts (display-range texts) is determined, a display command for the image is added to each part where the image text exists, and if two or more images of the image are included in one display range (page), the images except for one image are removed or moved from the display range, whereby the display layout for the display range (page) is determined.

Furthermore, in the embodiment, an electronic document is printed by a printer to which the electronic document display apparatus 1 outputs display content of the electronic document. However, the output layout (display layout) of the present invention is applicable to a case where an electronic document is printed by a printer to which another apparatus directly outputs data of the electronic document, not via the display unit 16.

Furthermore, in the embodiment, the ROM 12 is used as a computer readable medium to read the programs of the present invention. However, this is not a limit. For example, a nonvolatile memory such as a flash memory or a portable recording medium such as a CD-ROM can be used as the computer readable medium. Furthermore, a carrier wave can be used as a medium which provides data of the programs of the present invention via a communication line.

Furthermore, in the embodiment, all the images are left-aligned to be displayed, and if there is a space on the right side of each of the images, a text flows into the space so as to be displayed there. However, this is not a limit. For example, an image to be displayed for the second time and thereafter may be right-aligned, by which the image can be indicated to be displayed not for the first time. Furthermore, for example, whether or not to make a text flow into a space beside an image may be determined on the basis of a proportion of the width of the image to the width of the display screen. Furthermore, the above-described details, such as the specific configurations of the components of the electronic document display apparatus 1 and steps of the control procedure, can be appropriately changed without departing from the scope of the present invention.

According to a first aspect of the embodiment of the present invention, there is provided an electronic document display apparatus including: an analysis-and-setting unit which analyzes content of an electronic document including a text and an image, and sets display layout for the electronic document in accordance with a predetermined display format; and a display unit which displays the electronic document in the display layout set by the analysis-and-setting unit, the analysis-and-setting unit including: a determination unit which determines whether or not an image related to a display-range text of a display range to be displayed by the display unit is included in the display range; and a first correction unit which, in response to the determination unit determining that the image related to the display-range text is not included in the display range, adds an image display region where the image is displayed to the display range so as to correct the display layout in such a way that the image and at least a portion of an image text related to the image are included in the display range, wherein the analysis-and-setting unit changes a display state of the image displayed in the image display region on the basis of a predetermined condition.

Preferably, in the electronic document display apparatus, in response to the image to be displayed in the image display region added to the display range being already displayed in a previous display range of the electronic document, the analysis-and-setting unit reduces the image display region so that a display size of the image to be displayed in the display range is smaller than a display size of the image displayed in the previous display range.

Preferably, in the electronic document display apparatus, in response to a proportion of the image display region to a maximum image display region of the display unit being more than a predetermined proportion, the analysis-and-setting unit reduces the image display region so that the proportion is equal to or less than the predetermined proportion.

Preferably, in the electronic document display apparatus, in response to a plurality of images and a plurality of image texts respectively related to the images being included in the display range, the analysis-and-setting unit sets the display layout by adding the image display region where at least one image of the images is displayed to the display range, and the display unit displays the images in successive display in which the images are displayed by turns in the image display region of the display range.

Preferably, in the electronic document display apparatus, the analysis-and-setting unit includes a display selection unit which selects simultaneous display in which the images are displayed simultaneously in the image display region of the display range or the successive display on the basis of a predetermined condition, and the analysis-and-setting unit sets the display layout on the basis of the selection.

Preferably, the electronic document display apparatus further includes an operation unit which receives an instruction from a user, wherein the display selection unit selects the simultaneous display or the successive display on the basis of the instruction received by the operation unit.

Preferably, the electronic document display apparatus further includes a switch control unit which switches the images at predetermined time intervals when the display unit displays the images in the successive display.

Preferably, the electronic document display apparatus according further includes: an operation unit which receives an instruction from a user; and a switch control unit which switches the images on the basis of the instruction received by the operation unit when the display unit displays the images in the successive display.

Preferably, in the electronic document display apparatus, the determination unit determines whether or not only one of (i) the image and (ii) at least a portion of the image text related to the image is included in the display range, and the analysis-and-setting unit includes a second correction unit which, in response to the determination unit determining that only one of (i) the image and (ii) the at least a portion of the image text related to the image is included in the display range, excludes (a) the image display region where the image is displayed or (b) an image text related to an image not included in the display range from the display range on the basis of a predetermined condition so as to correct the display layout.

Preferably, in the electronic document display apparatus, the analysis-and-setting unit includes a display proportion calculation unit which, in response to at least a portion of each of image texts respectively related to images being included in the display range, calculates a proportion of the image text appearing last in the display range to the display-range text of the display range, and in response to the proportion being equal to or less than a predetermined proportion, the second correction unit corrects the display layout.

Preferably, in the electronic document display apparatus, the analysis-and-setting unit determines whether or not to allow the display layout corrected by the first correction unit on the basis of the predetermined display format or the display layout corrected by the second correction unit on the basis of the predetermined display format to be reflected on the display range.

Preferably, the electronic document display apparatus further includes a display control unit which performs control to reduce, redisplay or temporarily remove the image display region on the basis of a predetermined condition, wherein in response to the display control unit performing the control, the first correction unit or the second correction unit corrects a text display region where the display-range text is displayed of the display range and the display layout.

Preferably, in the electronic document display apparatus, the display control unit performs the control to temporarily remove the image display region after the image is displayed in the image display region for a predetermined period of time.

Preferably, the electronic document display apparatus further includes an operation unit which receives an instruction from a user, wherein the display control unit performs the control on the basis of the instruction received by the operation unit.

Preferably, the electronic document display apparatus further includes a storage unit which stores a display position and the display size of the image displayed on the display unit for the first time, the display position and the display size being correlated with identification information on the image, wherein in response to the image being included in the display range, the first correction unit sets the display position and the display size of the image on the basis of the display position and the display size stored in the storage unit.

Preferably, in the electronic document display apparatus, in response to the electronic document being described in a structured language, the analysis-and-setting unit analyzes the content of the electronic document, and sets the display layout.

Preferably, in the electronic document display apparatus, the image text related to the image is a text of a paragraph in which a display command for the image is included.

Preferably, in the electronic document display apparatus, the image text related to the image is a text of a paragraph in which the image is clearly mentioned.

According to a second aspect of the embodiment of the present invention, there is provided an image processing apparatus including: an analysis-and-setting unit which analyzes content of an electronic document including a text and an image, and sets output layout for the electronic document in accordance with a predetermined display format; and an output unit which outputs the electronic document in the output layout set by the analysis-and-setting unit on a predetermined output range basis, the analysis-and-setting unit including: a determination unit which determines whether or not an image related to an output-range text of the output range to be outputted by the output unit is included in the output range; and a first correction unit which, in response to the determination unit determining that the image related to the output-range text is not included in the output range, adds an image display region where the image is displayed to the output range so as to correct the output layout in such a way that the image and at least a portion of an image text related to the image are included in the output range, wherein the analysis-and-setting unit changes a display state of the image displayed in the image display region on the basis of a predetermined condition.

According to a third aspect of the embodiment of the present invention, there is provided an image output method including: an analysis-and-setting step of analyzing content of an electronic document including a text and an image, and setting output layout for the electronic document in accordance with a predetermined display format; and an output step of outputting the electronic document in the output layout set in the analysis-and-setting step on a predetermined output range basis, the analysis-and-setting step including: a determination step of determining whether or not an image related to an output-range text of the output range to be outputted in the output step is included in the output range; and a first correction step of, in response to determining that the image related to the output-range text is not included in the output range in the determination step, adding an image display region where the image is displayed to the output range so as to correct the output layout in such a way that the image and at least a portion of an image text related to the image are included in the output range, wherein in the analysis-and-setting step, a display state of the image displayed in the image display region is changed on the basis of a predetermined condition.

According to a fourth aspect of the embodiment of the present invention, there is provided a computer readable recording medium storing a program allowing a computer including a display unit which displays an electronic document including a text and an image to function as: an analysis-and-setting unit which analyzes content of the electronic document, and sets display layout for the electronic document in accordance with a predetermined display format; and a display output unit which displays the electronic document on the display unit in the display layout set by the analysis-and-setting unit, the analysis-and-setting unit including: a determination unit which determines whether or not an image related to a display-range text of a display range to be displayed by the display unit is included in the display range; and a first correction unit which, in response to the determination unit determining that the image related to the display-range text is not included in the display range, adds an image display region where the image is displayed to the display range so as to correct the display layout in such a way that the image and at least a portion of an image text related to the image are included in the display range, wherein the analysis-and-setting unit changes a display state of the image displayed in the image display region on the basis of a predetermined condition.

This application is based upon and claims the benefit of priority under 35 USC 119 of Japanese Patent Application No. 2011-274143 filed Dec. 15, 2011, the entire disclosure of which, including the description, claims, drawings, and abstract, is incorporated herein by reference in its entirety.

What is claimed is:

1. An electronic document display apparatus comprising:
   an analysis-and-setting unit which analyzes content of an electronic document including a text and an image, and sets display layout for the electronic document in accordance with a predetermined display format; and
   a display unit which displays the electronic document in the display layout set by the analysis-and-setting unit,
   the analysis-and-setting unit including:
      a determination unit which determines whether or not an image related to a display-range text of a display range to be displayed by the display unit is included in the display range; and
      a first correction unit which, in response to the determination unit determining that the image related to the display-range text is not included in the display range, adds an image display region where the image is displayed to the display range so as to correct the display layout in such a way that the image and at least a portion of an image text related to the image are included in the display range, wherein
   the analysis-and-setting unit changes a display state of the image displayed in the image display region on the basis of a predetermined condition,
   wherein in response to a plurality of images and a plurality of image texts respectively related to the images being included in the display range, the analysis-and-setting unit sets the display layout by adding the image display region where at least one image of the images is displayed to the display range, and wherein the display unit displays the images in successive display in which the images are displayed by turns in the image display region of the display range.

2. The electronic document display apparatus according to claim 1, wherein in response to the image to be displayed in the image display region added to the display range being already displayed in a previous display range of the electronic document, the analysis-and-setting unit reduces the image display region so that a display size of the image to be displayed in the display range is smaller than a display size of the image displayed in the previous display range.

3. The electronic document display apparatus according to claim 1, wherein in response to a proportion of the image display region to a maximum image display region of the display unit being more than a predetermined proportion, the analysis-and-setting unit reduces the image display region so that the proportion is equal to or less than the predetermined proportion.

4. The electronic document display apparatus according to claim 1, wherein
the analysis-and-setting unit includes a display selection unit which selects simultaneous display in which the images are displayed simultaneously in the image display region of the display range or the successive display on the basis of a predetermined condition, and
the analysis-and-setting unit sets the display layout on the basis of the selection.

5. The electronic document display apparatus according to claim 4 further comprising an operation unit which receives an instruction from a user, wherein
the display selection unit selects the simultaneous display or the successive display on the basis of the instruction received by the operation unit.

6. The electronic document display apparatus according to claim 1 further comprising a switch control unit which switches the images at predetermined time intervals when the display unit displays the images in the successive display.

7. The electronic document display apparatus according to claim 1 further comprising:
an operation unit which receives an instruction from a user; and
a switch control unit which switches the images on the basis of the instruction received by the operation unit when the display unit displays the images in the successive display.

8. The electronic document display apparatus according to claim 1, wherein
the determination unit determines whether or not only one of (i) the image and (ii) at least a portion of the image text related to the image is included in the display range, and
the analysis-and-setting unit includes a second correction unit which, in response to the determination unit determining that only one of (i) the image and (ii) the at least a portion of the image text related to the image is included in the display range, excludes (a) the image display region where the image is displayed or (b) an image text related to an image not included in the display range from the display range on the basis of a predetermined condition so as to correct the display layout.

9. The electronic document display apparatus according to claim 8, wherein
the analysis-and-setting unit includes a display proportion calculation unit which, in response to at least a portion of each of image texts respectively related to images being included in the display range, calculates a proportion of the image text appearing last in the display range to the display-range text of the display range, and
in response to the proportion being equal to or less than a predetermined proportion, the second correction unit corrects the display layout.

10. The electronic document display apparatus according to claim 8, wherein the analysis-and-setting unit determines whether or not to allow the display layout corrected by the first correction unit on the basis of the predetermined display format or the display layout corrected by the second correction unit on the basis of the predetermined display format to be reflected on the display range.

11. The electronic document display apparatus according to claim 8 further comprising a display control unit which performs control to reduce, redisplay or temporarily remove the image display region on the basis of a predetermined condition, wherein
in response to the display control unit performing the control, the first correction unit or the second correction unit corrects a text display region where the display-range text is displayed of the display range and the display layout.

12. The electronic document display apparatus according to claim 11, wherein the display control unit performs the control to temporarily remove the image display region after the image is displayed in the image display region for a predetermined period of time.

13. The electronic document display apparatus according to claim 11 further comprising an operation unit which receives an instruction from a user, wherein
the display control unit performs the control on the basis of the instruction received by the operation unit.

14. The electronic document display apparatus according to claim 1 further comprising a storage unit which stores a display position and the display size of the image displayed on the display unit for the first time, the display position and the display size being correlated with identification information on the image, wherein
in response to the image being included in the display range, the first correction unit sets the display position and the display size of the image on the basis of the display position and the display size stored in the storage unit.

15. The electronic document display apparatus according to claim 1, wherein in response to the electronic document being described in a structured language, the analysis-and-setting unit analyzes the content of the electronic document, and sets the display layout.

16. The electronic document display apparatus according to claim 1, wherein the image text related to the image is a text of a paragraph in which a display command for the image is included.

17. The electronic document display apparatus according to claim 1, wherein the image text related to the image is a text of a paragraph in which the image is clearly mentioned.

18. An image processing apparatus comprising:
an analysis-and-setting unit which analyzes content of an electronic document including a text and an image, and sets output layout for the electronic document in accordance with a predetermined display format; and
an output unit which outputs the electronic document in the output layout set by the analysis-and-setting unit on a predetermined output range basis,
the analysis-and-setting unit including:

a determination unit which determines whether or not an image related to an output-range text of the output range to be outputted by the output unit is included in the output range; and a first correction unit which, in response to the determination unit determining that the image related to the output-range text is not included in the output range, adds an image display region where the image is displayed to the output range so as to correct the output layout in such a way that the image and at least a portion of an image text related to the image are included in the output range, wherein the analysis-and-setting unit changes a display state of the image displayed in the image display region on the basis of a predetermined condition, in response to a plurality of images and a plurality of image texts respectively related to the images being included in the display range, the analysis-and-setting unit sets the display layout by adding the image display region where at least one image of the images is displayed to the display range, and the display unit displays the images in successive display in which the images are displayed by turns in the image display region of the display range.

19. An image output method comprising:

an analysis-and-setting step of analyzing content of an electronic document including a text and an image, and setting output layout for the electronic document in accordance with a predetermined display format; and an output step of outputting the electronic document in the output layout set in the analysis-and-setting step on a predetermined output range basis, the analysis-and-setting step including:

a determination step of determining whether or not an image related to an output-range text of the output range to be outputted in the output step is included in the output range; and a first correction step of, in response to determining that the image related to the output-range text is not included in the output range in the determination step, adding an image display region where the image is displayed to the output range so as to correct the output layout in such a way that the image and at least a portion of an image text related to the image are included in the output range, wherein in the analysis-and-setting step, a display state of the image displayed in the image display region is changed on the basis of a predetermined condition, in response to a plurality of images and a plurality of image texts respectively related to the images being included in the display range, the analysis-and-setting unit sets the display layout by adding the image display region where at least one image of the images is displayed to the display range, and the display unit displays the images in successive display in which the images are displayed by turns in the image display region of the display range.

20. A non-transitory computer readable recording medium storing a program allowing a computer including a display unit which displays an electronic document including a text and an image to function as an analysis-and-setting unit which analyzes content of the electronic document, and sets display layout for the electronic document in accordance with a predetermined display format; and a display output unit which displays the electronic document on the display unit in the display layout set by the analysis-and-setting unit, the analysis-and-setting unit including:

a determination unit which determines whether or not an image related to a display-range text of a display range to be displayed by the display unit is included in the display range; and a first correction unit which, in response to the determination unit determining that the image related to the display-range text is not included in the display range, adds an image display region where the image is displayed to the display range so as to correct the display layout in such a way that the image and at least a portion of an image text related to the image are included in the display range, wherein the analysis-and-setting unit changes a display state of the image displayed in the image display region on the basis of a predetermined condition, wherein in response to a plurality of images and a plurality of image texts respectively related to the images being included in the display range, the analysis-and-setting unit sets the display layout by adding the image display region where at least one image of the images is displayed to the display range, and wherein the display unit displays the images in successive display in which the images are displayed by turns in the image display region of the display range.

\* \* \* \* \*